H. T. DUTTER.
ROTARY VALVE.
APPLICATION FILED JUNE 28, 1920.

1,371,031.

Patented Mar. 8, 1921.
2 SHEETS—SHEET 1.

H. T. DUTTER.
ROTARY VALVE.
APPLICATION FILED JUNE 28, 1920.

1,371,081.

Patented Mar. 8, 1921.

WITNESSES

INVENTOR
H. T. DUTTER,

BY

ATTORNEYS

UNITED STATES PATENT OFFICE.

HUGH THOMAS DUTTER, OF ALBUQUERQUE, NEW MEXICO.

ROTARY VALVE.

1,371,081.   Specification of Letters Patent.   Patented Mar. 8, 1921.

Application filed June 28, 1920. Serial No. 392,189.

*To all whom it may concern:*

Be it known that I, HUGH THOMAS DUTTER, a citizen of the United States, and a resident of Albuquerque, in the county of Bernalillo and State of New Mexico, have invented certain new and useful Improvements in Rotary Valves, of which the following is a specification.

This invention has reference to gas or internal combustion engines and more particularly to an improved rotary valve structure for controlling and timing the inlet of the gaseous fuel charge or mixture to the cylinder or cylinders of a motor and the discharge of the exhaust or burned gases therefrom, the construction being such as to produce higher efficiency than with the puppet valve type of motor, requiring fewer parts, thus reducing the cost of operation and waste and resulting in a quiet running motor due to the absence of all cams and cam followers or push rods, reducing the cost of production and maintenance and permitting operation indefinitely without regrinding or resetting valves, as well as serving to pre-heat or superheat the intake charge at the moment of entering the cylinder, so as to facilitate combustion and permit of economical and efficient use of low grade fuel.

The invention further contemplates an improved valve adapted to be mounted in the head of the cylinder and has direct connection with the intake manifold until a corresponding communication is established between the intake manifold and the interior of the cylinders, in addition to a direct connection between the cylinder and the exhaust manifold in lieu of the tortuous passages required in connection with puppet valves thus producing higher efficiency, while making provision for the expansion and contraction of the parts at the valve caused by the heat of the exhaust gases passing through at the moment of exhausting a burned charge and the cooling effect of the incoming charge which passes around the exhaust passage, the parts being capable of being easily cooled and subject to uniform lubrication by known methods, while operative connection is provided between the valve and the crank shaft of the motor for operating the former at the proper speed ratio to insure proper timings of the parts in operation.

While the exemplification of the invention illustrated in the accompanying drawings discloses a structure adapted to secure the desired result, and the preferred embodiment, I am aware that in the wide field of mechanics other ways may readily be resorted to, to accomplish the ends sought and it is to be understood that the invention is not limited to the particular form of the valve shown, but that it includes within its purview, whatever changes fairly come within the spirit of the appended claims.

Reference is had to the accompanying drawings forming a part of this application, in which:—

Figure 1:
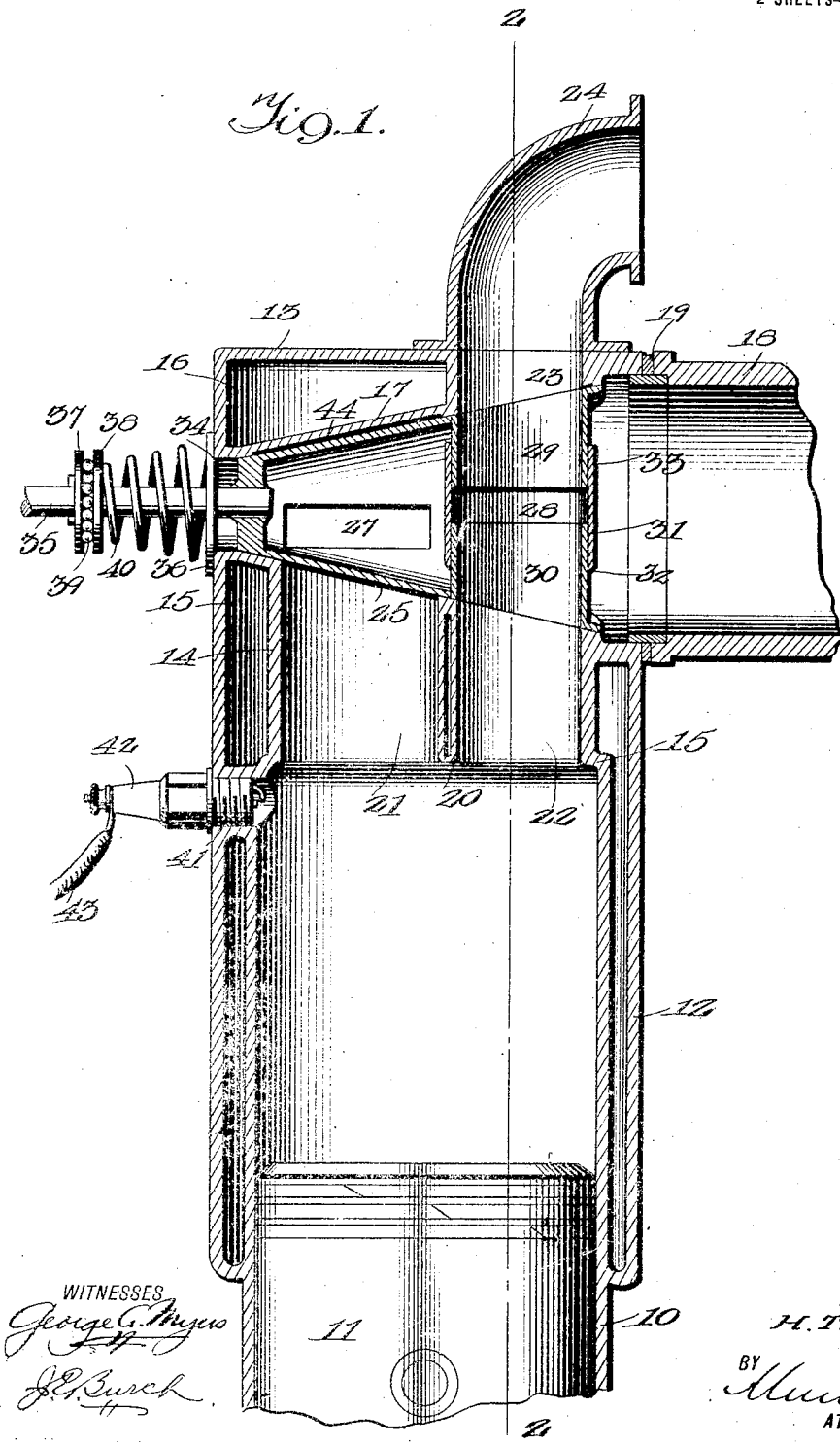
Figure 1 is a vertical longitudinal sectional view of the cylinder of a gas engine or internal combustion motor having the head thereof equipped with the improved rotary valve.
Figure 2:
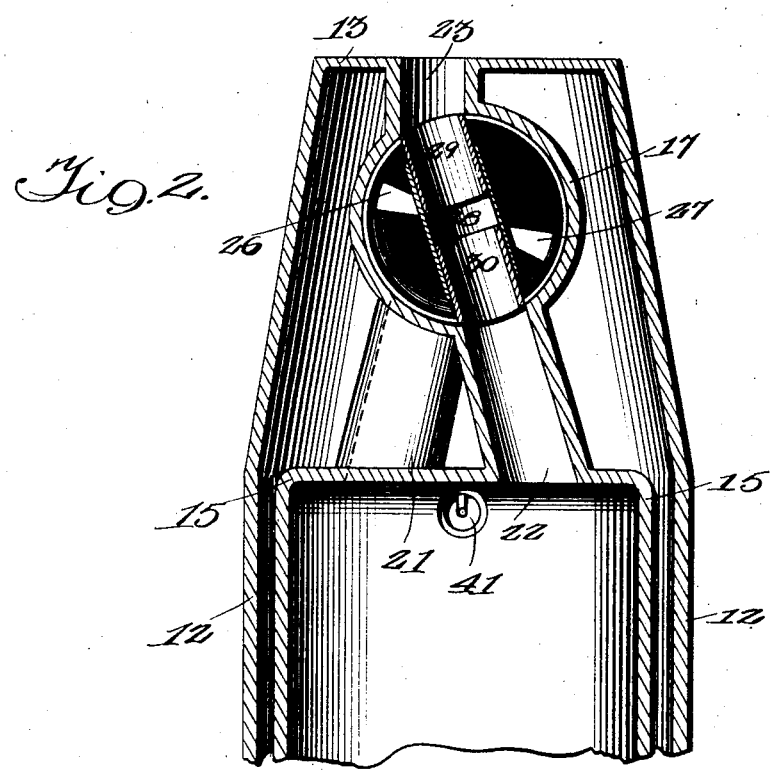
Fig. 2 is a similar sectional view taken at right angles to Fig. 1 as indicated by the section line 2—2 on said figure.
Figure 3:
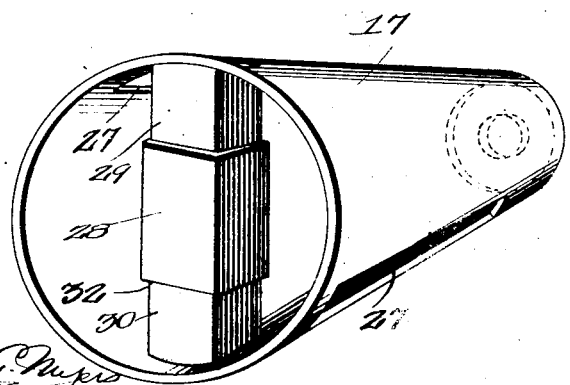
Fig. 3 is a perspective view of the valve.

Referring in detail to the illustrated embodiment, there is shown a cylinder 10 with a piston 11 operating therein, the cylinder having at its head end a double wall forming a water jacket 12 which in lieu of terminating in the usual way, is extended upward to the head end or head 13 of the cylinder, which is shown made integral with the cylinder and water jacket, but which may be the usual removable or detachable head. The bore of the cylinder produced by the inner wall at the jacket is preferably made of smaller diameter or reduced in size at the upper portion thereof, as shown at 14, to produce a shoulder 15, it being understood that the stroke of the piston is only sufficient to give the necessary clearance below said shoulder. In this manner, the water cooling jacket is extended upward to the portions 15 and 16 above that portion of the cylinder in which the piston works.

Cast or otherwise formed in the upper or the extension portion of the cylinder so as to extend diametrically thereof, is a tubular valve casing or seat 17 preferably of substantially conical or frusto-conical outline and longitudinal section, being joined to the walls of the cylinder at the ends thereof, which ends are open.

At the large end or base of the seat, an opening is made in the cylinder and jacket thereof to afford connection with the intake manifold or branch thereof 18, as designated at 19, the connection being detachable and fluid-tight. A hollow partition 20 is arranged diametrically at right angles to the axis of the seat and preferably formed integral therewith and the cylinder in the upper portion of the latter above the shoulder 15 so that the portion 14 is divided to produce an intake passage 21 and an exhaust passage 22 inclined in opposite directions, while the passage 22 extends to the opposite side of the valve seat or casing as designated at 23 for connection with the exhaust manifold through the medium of the curved outlet pipe 24 which extends laterally to one side of the engine carrier. It will be seen that the seat or valve casing 17 is provided with three openings or ports, one leading into the intake passage 21 and bottom, an adjacent one leading into the exhaust passage 22, also at the bottom, and a third leading into the exhaust outlet at the top in alinement with the passage 22, while both ends of the seat or casing of the valve are open as herebefore specified.

It will be noted that the exhaust port leading into the cylinder is exactly opposite the exhaust port which leads to the exhaust manifold and in order to control the supply of gaseous mixture to the cylinder or cylinders and the discharge or exhaust of the burned or spent gases, a relatively hollow conical or frusto-conical valve 25 is provided, the same being in the form of a hollow cone or shell of any suitable material, such as cast iron, lynite, aluminum, etc., and is provided with one or more openings or ports 26 and 27 designed to aline with the intake passage 21 and located near the apex or small end of the valve shell, all as clearly shown in Fig. 1 of the drawings. The exhaust port of the valve is built into the large end thereof and embodies a diametrical passage which is designed to take care of the expansion and contraction caused by the heat of the exhaust gases passing through it at the moment of exhausting a burned charge, and the cooling effect of the incoming charge which passes around of it to the intake ports of which there are two, which are cut through the wall back of the exhaust ports and toward the small end of the valve, as already described, the lateral wall of the valve shell being provided with ports or openings 26 and 27 if desired, at either side of the rectangular exhaust passage 28. The latter comprises opposed extensions 29 and 30 in the form of short tubes leading from diametrically opposite directions of the valve shell in opposite directions toward each other and spaced apart at the center. To one of these sections or extensions in the form of short tubes, a sleeve 31 is secured, preferably to the tube 30 as indicated at 32, so as to close the space between the inner ends of the tubes or extensions 29 and 30 and form an expansion joint by reason of its telescopic relation to the former as indicated at 33. The sleeve is preferably welded to one of the tubes or extensions, the other end being free to slide and the companion tube or extension, thus allowing expansion and contraction caused by the heat of the exhaust gases passing through it at the moment of exhausting a burned charge, and the cooling effect of the incoming charge which passes around the exhaust port to the intake port and into the cylinder. This connection also furnishes a fluid-tight joint of a simple and durable character.

The opposite end of the valve shell 25 is designated at 34 and is provided with an axial opening in which a shaft 35 similarly related to the valve, is fixed as by welding, while means are provided between the shaft and the motor casing or cylinder to hold the valve against its seat and insure an effective joint between the surfaces thereof, such as to produce a grinding fit or joint by reason of the tapered or conical formation thereof. As illustrated, a washer plate 36 is arranged over the opening of the valve seat or casing and engaged with the side of the cylinder, while secured to the shaft 35 is a disk 37 adjacent to which there is disposed on the shaft a loose disk 38, suitable anti-friction means or ball bearings 39 being arranged between the disks so that as the shaft is driven to rotate the valve in its seat or bearings, the disk 37 may freely rotate against the disk 38 between which and the washer plate 36 means are arranged to exert outward pressure against the disk 38 and thus tend to move the shaft 35 axially, whereby the valve will be held snugly against its seat. As shown, a spiral spring 40 is employed, the same being disposed around the shaft 35 and contacting with the washer plate 36 and a disk 38 at its opposite ends, so as to exert outward pressure against the disk 38 and thus to the shaft 35 through the disk 37 for the purposes already stated. The shaft 35 is adapted to be driven or rotated in any desired way and preferably derives its power and direction of rotation from the crank shaft of the motor, as through the medium of an interposed shaft and gears which may be either spiral or bevel gears, by means of sprockets and chains or other suitable operative connection by which the valves may be geared down to one-fourth the crank shaft speed. In other words, the crank shaft makes four revolutions to each revolution of the valve.

In lieu of arranging the spark plug at the head end of the cylinder, an opening 41 is arranged at the side preferably below the shoulder 15 and internally threaded to accommodate the spark plug or plugs 42 having connection with the source of energy indicated at 43. Lubrication may be either force feed or by mixing the correct amount of oil with the fuel, oil grooves 44 being cut, one on each side of the manifold exhaust port in the valve seat and lengthwise, so as to distribute the oil over the face of the revolving valve uniformly, in order that its free rotation may be insured without excessive wear. Of course, it must be understood that the wear on the valve parts is only caused by the contact thereof under the pressure of the spring 40, which is relatively weak. It will thus be manifest that higher efficiency can be obtained with a valve structure of the type described than with the puppet valve of motor, first because of the direct openings for both intake and exhaust ports and secondly, because of the superheating of the intake charge at the moment of entering the cylinder, which is of especial value where low grade fuel is used. The valve can be run indefinitely without regrinding or resetting and fewer parts are required than in a puppet type of motor, thereby reducing the cost of operation and waste and insuring a quiet operating motor, due especially to the absence of all cams and cam followers or push rods.

In the operation of the motor in accordance with the described construction, the valve 25 rotates during the reciprocation of the piston 11 and when the valve is in position to aline the ports 26 with the passage 21, the exhaust ports or passage through the valve is disposed horizontally at right angles to the position shown in Fig. 1 or substantially so, in view of the inclined position of the passages, thus closing the exhaust ports. The gaseous mixture is then drawn into the cylinder on the intake stroke of the piston and on the compression stroke of the piston, the ports are all closed. The gas is being compressed within the cylinder, the necessary spark is produced at the points of the spark plug 42 to ignite the same, forcing the piston outwardly on the working stroke. As the piston returns, the exhaust passage is opened and the intake passage closed, thus insuring the complete discharge of the burned or spent gases with subsequent charging of the gaseous mixture when the exhaust passage is closing and the intake passage is being opened. Proper timing of the rotation of the valve relative to the speed of rotation of the crank shaft and the operation of the piston, affords accurate means for controlling the supply of the gaseous mixture and the exhaust of the burned gases, the ratio preferably being such that the valve rotates once for each four revolutions of the crank shaft.

In view of the foregoing, it is thought that the operation of the device will be readily understood and in view of the simplicity and practical value that it will commend itself to those skilled in the art.

Having thus described my invention, what I claim is:—

1. A rotary valve for gas engines, comprising the combination with the cylinder having an intake passage and an exhaust passage; of a conical valve seat extending diametrically of the cylinder of the head portion thereof, ignition means at one side of the cylinder, a substantially conical valve fitting said seat for rotation and having one or more ports therethrough establishing communication between the interior of the cylinder and the intake passage independently of the exhaust passage, a sectional tubular passage across the large end of the valve and adapted to expand and contract under the action of the alternately passing heated and cooled products or gases, means for holding said valve against its seat, and means for rotating the valve in proper ratio to the speed of rotation of the crank shaft of the motor and the reciprocation of the piston.

2. The combination with an engine cylinder of an internal combustion engine, having a closed head and a conical valve seat extending across the same and open at its large end for communication with an intake manifold, said cylinder having a diametrical partition forming a pair of passages between the compression chamber of the cylinder and the interior of the seat, one of said passages being extended through the head of the cylinder for connection with an exhaust manifold, a conical valve fitting said seat and having an intake opening designed to establish communication between the intake manifold and the interior of the cylinder through the corresponding passage in one position of the valve, a diametrical passage across the valve having a slip joint to allow for contraction and expansion and adapted to alternately establish communication between the exhaust manifold and the interior of the cylinder through the corresponding exhaust passage with the communication established by the intake opening, spring means frictionally holding said valve against its seat, and means for rotating the valve one quarter revolution for each revolution of the crank shaft of the motor.

3. The combination with an engine cylinder of an internal combustion engine, having a closed head and a conical valve seat extending across the same and open at its large end for communication with an intake manifold, a conical valve fitting said seat and having an intake opening designed to establish communication between the intake manifold and the interior of the cylinder through the corresponding passage in one position of the valve, a diametrical passage across the valve having a slip joint to allow for contraction and expansion and adapted to alternately establish communication between the exhaust manifold and the interior of the cylinder through the corresponding exhaust passage with the communication established by the intake opening, said means comprising a shaft extended axially from the small end of the valve and fixed thereto, a spring engaged against the adjacent face of the cylinder around the shaft, a rotatable bearing on the shaft against which the opposite end of the spring bears to permit independent rotation of the shaft with respect to the spring, and means for rotating the shaft.

4. The combination with the cylinder of an internal combustion engine having a jacketed wall and an exhaust passage leading through the head thereof, together with an opening at the lateral wall for communication with an intake manifold; of a conical valve casing formed with the cylinder and extending diametrically thereof, said cylinder having independent passages side by side and extending axially for communication with said manifolds, a conical valve in said casing and having its apex end provided with an apertured wall, a shaft secured thereto and extending outwardly to be suitably driven, said valve having one or more passages therethrough for communication with the intake passage and adapted to establish communication with the intake manifold through the valve, and a passage across the large end of the valve comprising sleeve extensions leading through the same at diametrically opposite points, and a slip joint comprising a sleeve fitting over the sleeve extensions and secured to one for telescopic movement with respect to the other under the action of the gaseous supply and burned gases causing the expansion and contraction thereof.

5. The combination with an engine cylinder of an internal combustion engine, having a closed head and a conical valve seat extending across the same and open at its large end for communication with an intake manifold, a conical valve fitting said seat and having an intake opening designed to establish communication between the intake manifold and the interior of the cylinder through the corresponding passage in one position of the valve, a diametrical passage across the valve having a slip joint to allow for contraction and expansion and adapted to alternately establish communication between the exhaust manifold and the interior of the cylinder through the corresponding exhaust passage with the communication established by the intake opening, and means for rotating the valve one quarter revolution for each revolution of the crank shaft of the motor.

HUGH THOMAS DUTTER.